(12) United States Patent
Makulec et al.

(10) Patent No.: US 9,359,957 B2
(45) Date of Patent: Jun. 7, 2016

(54) PLANET GEAR FOR AIR TURBINE STARTER SYSTEM

(75) Inventors: Jeffrey M. Makulec, Rockford, IL (US); Matthew Slayter, Rockford, IL (US); Charles E. Long, Rockford, IL (US); Thomas Jakab, Oconomowoc, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1274 days.

(21) Appl. No.: 13/271,456

(22) Filed: Oct. 12, 2011

(65) Prior Publication Data

US 2013/0091863 A1 Apr. 18, 2013

(51) Int. Cl.
| | |
|---|---|
| F16H 57/08 | (2006.01) |
| F02C 7/277 | (2006.01) |
| F16H 55/17 | (2006.01) |
| F16H 1/28 | (2006.01) |

(52) U.S. Cl.
CPC ............. *F02C 7/277* (2013.01); *F16H 55/17* (2013.01); *F05D 2260/40311* (2013.01); *F16H 2001/2881* (2013.01); *Y10T 29/49464* (2015.01)

(58) Field of Classification Search
None
See application file for complete search history.

(56) References Cited

U.S. PATENT DOCUMENTS

| | | | |
|---|---|---|---|
| 4,104,933 A | 8/1978 | Campbell | |
| 5,242,336 A | 9/1993 | Hori | |
| 5,665,020 A * | 9/1997 | Kamada et al. | 475/129 |
| 6,378,391 B2 * | 4/2002 | Forsyth | 74/331 |
| 6,527,660 B1 | 3/2003 | Sugden | |
| 6,676,558 B2 | 1/2004 | Futterer | |
| 6,719,658 B2 | 4/2004 | Haga et al. | |
| 6,892,455 B1 | 5/2005 | Feest | |
| 6,960,147 B2 | 11/2005 | Kolstrup | |
| 7,250,688 B2 | 7/2007 | Thomson | |
| 7,422,540 B2 | 9/2008 | Neudecker et al. | |
| 7,708,663 B2 | 5/2010 | Himmelmann et al. | |
| 7,737,591 B2 | 6/2010 | Himmelmann et al. | |
| 8,020,299 B2 * | 9/2011 | Shirokoshi | 29/893.2 |
| 8,769,819 B2 * | 7/2014 | Paelicke et al. | 29/893.2 |
| 8,894,537 B2 * | 11/2014 | Norem et al. | 475/331 |
| 2009/0084207 A1 * | 4/2009 | Raman et al. | 74/325 |

FOREIGN PATENT DOCUMENTS

| | | |
|---|---|---|
| CN | 101074719 A | 11/2007 |
| WO | WO 2013001627 A1 * | 1/2013 |

OTHER PUBLICATIONS

"Stress Concentrations at Fillets, Holes, and Keyways as Found by the Plaster-Model Method", University of Illinois Bulletin, No. 276, Jun. 1935.*

(Continued)

*Primary Examiner* — Dirk Wright
(74) *Attorney, Agent, or Firm* — Carlson, Gaskey & Olds, PC

(57) ABSTRACT

A planet gear for use in an air turbine starter is formed of a first part having a set of gear teeth at a first axial location. A shaft extends axially away from the first set of gear teeth. A second part is interference fit on the first part, with the second part having a second set of gear teeth. The second part is mounted on the shaft of the first part. An outer diameter of the shaft is selected to be significantly larger than an inner diameter of a cylindrical portion of the second part which is interference fit on the shaft. A ratio of the outer diameter to the inner diameter is between 1.0005 and 1.0100. A planetary gear system, an air turbine starter and a method of installing a planet gear are also disclosed.

4 Claims, 4 Drawing Sheets

(56) References Cited

OTHER PUBLICATIONS

"Measurement of interface pressure in interference fits", Proc. IMechE vol. 219, Part C: J. Mechanical Engineering Science, Jan. 2004.*
"Improving Machinery Reliability", third edition, Bloch, copyright 1998, pp. 11-14 and 43-58.*
"Improving Machinery Reliability", third edition, Bloch, copyright 1998, pp. 211-223.*
Machinery'sHandbook, $24^{th}$ Eddition, 1991 pp. 618-629.*
"Shigley's Mechanical Engineering Design" Eighth Edition, 2006.*
"Optimal Shape design of shoulder fillets for flat and round bars under variious loadings" Nov. 2008, Proc. IMechE vol. 223 Part C: J. Mechanical Engineering Science, pp. 1741-1754.*
"An Analysis of Stress Concentration in Compound Fillets produced during dimensional restortation repair of jet engine components" Dec. 2009, Townes, Jr. Master's Thesis, Rensselaer Polytechnic Institute.*

* cited by examiner

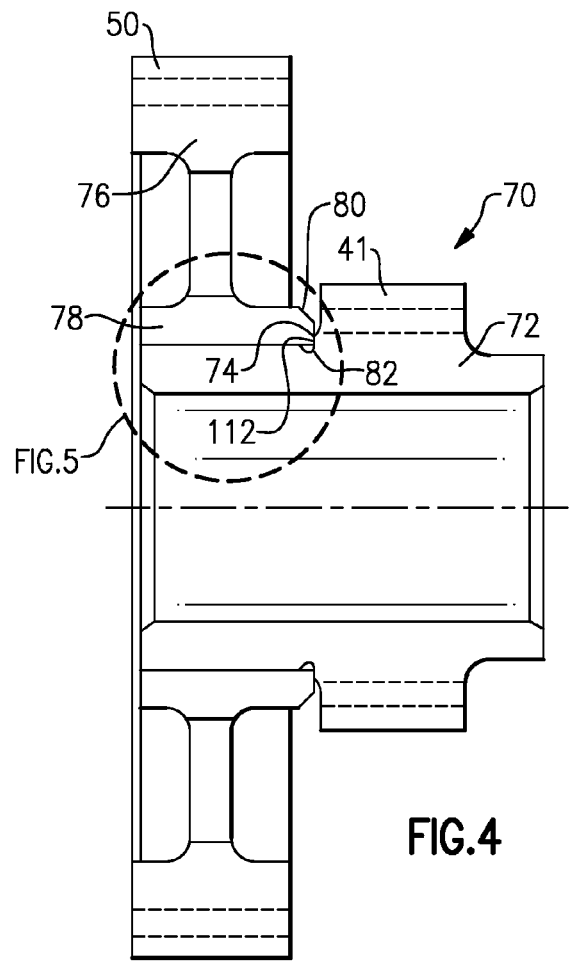
FIG.4
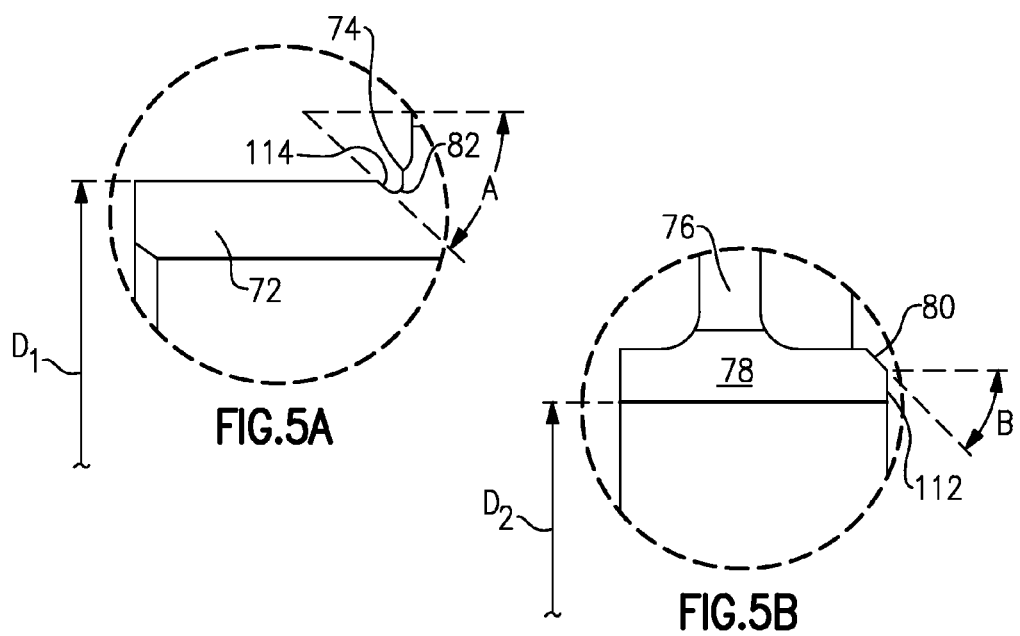
FIG.5A
FIG.5B

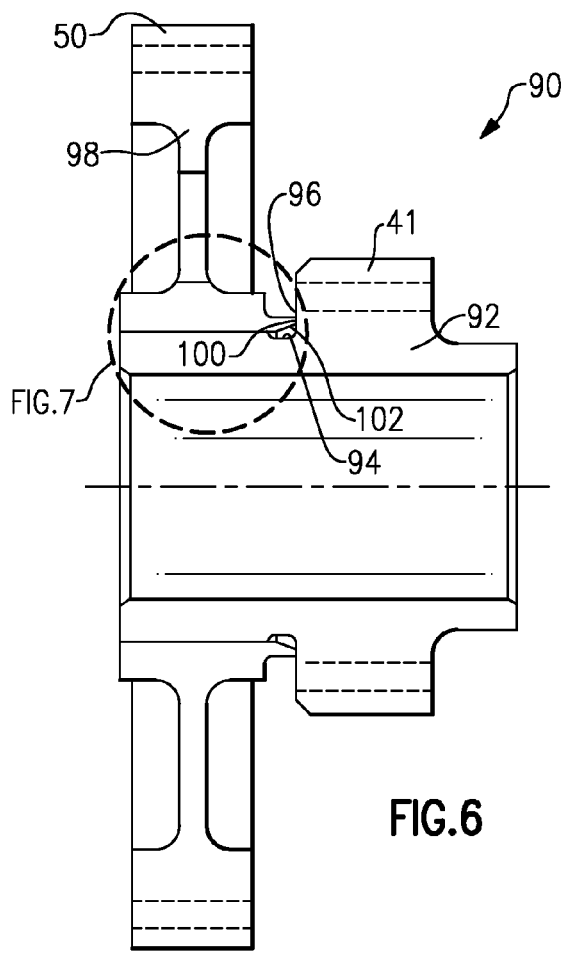
FIG.6
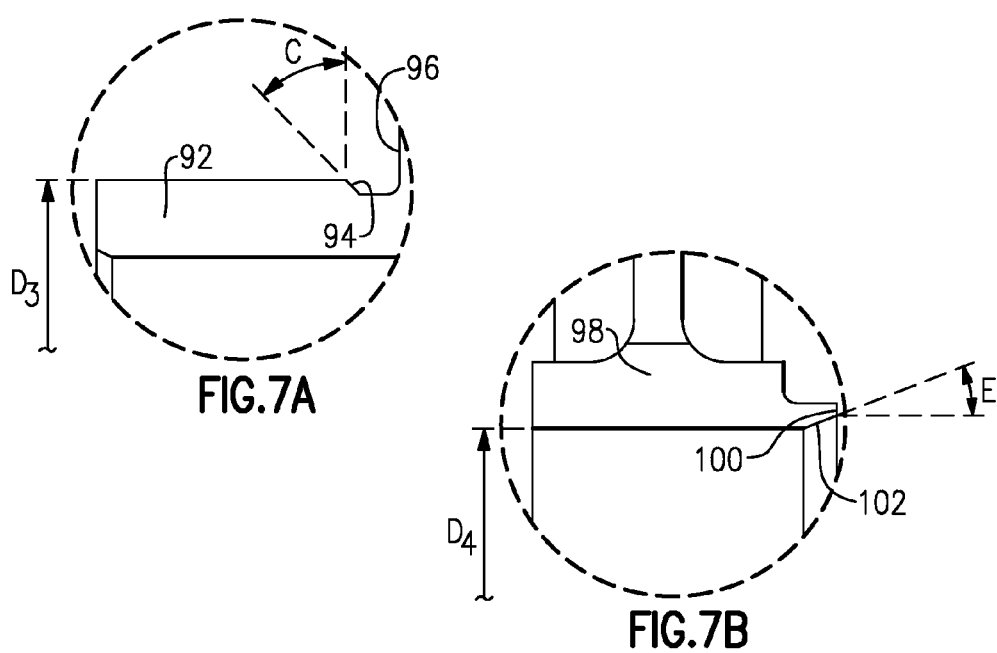
FIG.7A
FIG.7B

PLANET GEAR FOR AIR TURBINE STARTER SYSTEM

BACKGROUND

This application relates to a planet gear for incorporation into an air turbine starter.

Planetary gear systems are well known, and have been utilized to provide a speed change between an input and an output. A sun gear rotates about a central axis, and a ring gear rotates outwardly of the sun gear. A plurality of planet gears are positioned to transmit rotation between the sun and ring gears.

In one known type of planetary gear systems, the planet gears are mounted on stationary shafts positioned inwardly of the gears. The planet shaft provides an inner ring for bearings which support the planet gears.

One application of a planetary gear system is in an air turbine starter system. In an air turbine starter system, air is delivered across a turbine rotor to drive the rotor. The rotor drives a sun gear, which drives a ring gear through planet gears. The ring gear in turn drives a starter shaft for a gas turbine engine.

In one known air turbine starter system, the planet gears are mounted on a stationary shaft, and there are needle bearings positioned between the shaft and the interior of the planet gear. It is known to provide a surface treatment to the inner periphery of the planet gear to harden the surface such that the needle bearings are able to successfully run relative to the surface. One known hardening surface provides a carburized surface on the inner diameter of the gear.

However, in at least one known planet gear, the input teeth and the output teeth are provided by two separate gear portions which are secured together. In this known prior art, the two parts have been welded. The weld joint occurs at the outer periphery of a gear shaft, and relatively radially close to the inner periphery which is carburized. There has sometimes been a loss of hardness at the inner peripheral surface.

SUMMARY

A planet gear for use in an air turbine starter is formed of a first part having a set of gear teeth at a first axial location. A shaft extends axially away from the first set of gear teeth. A second part is interference fit on the first part, with the second part having a second set of gear teeth. The second part is mounted on the shaft of the first part. An outer diameter of the shaft is selected to be significantly larger than an inner diameter of a cylindrical portion of the second part which is interference fit on the shaft. A ratio of the outer diameter to the inner diameter is between 1.0005 and 1.0100. A planetary gear system, an air turbine starter and a method of installing a planet gear are also disclosed.

These and other features of this application will be better understood from the following specification and drawings, the following of which is a brief description:

BRIEF DESCRIPTION OF THE DRAWINGS

FIG. 4 shows a first embodiment gear.
FIG. 5A shows a detail at the circled 5 of FIG. 4.
FIG. 5B shows a second detail at the circled 5 of FIG. 4.
FIG. 6 shows a second embodiment.
FIG. 7A shows a detail at the surface 7 of FIG. 6.
FIG. 7B shows another detail at the circled 7 of FIG. 6.

DETAILED DESCRIPTION

Figure 1:
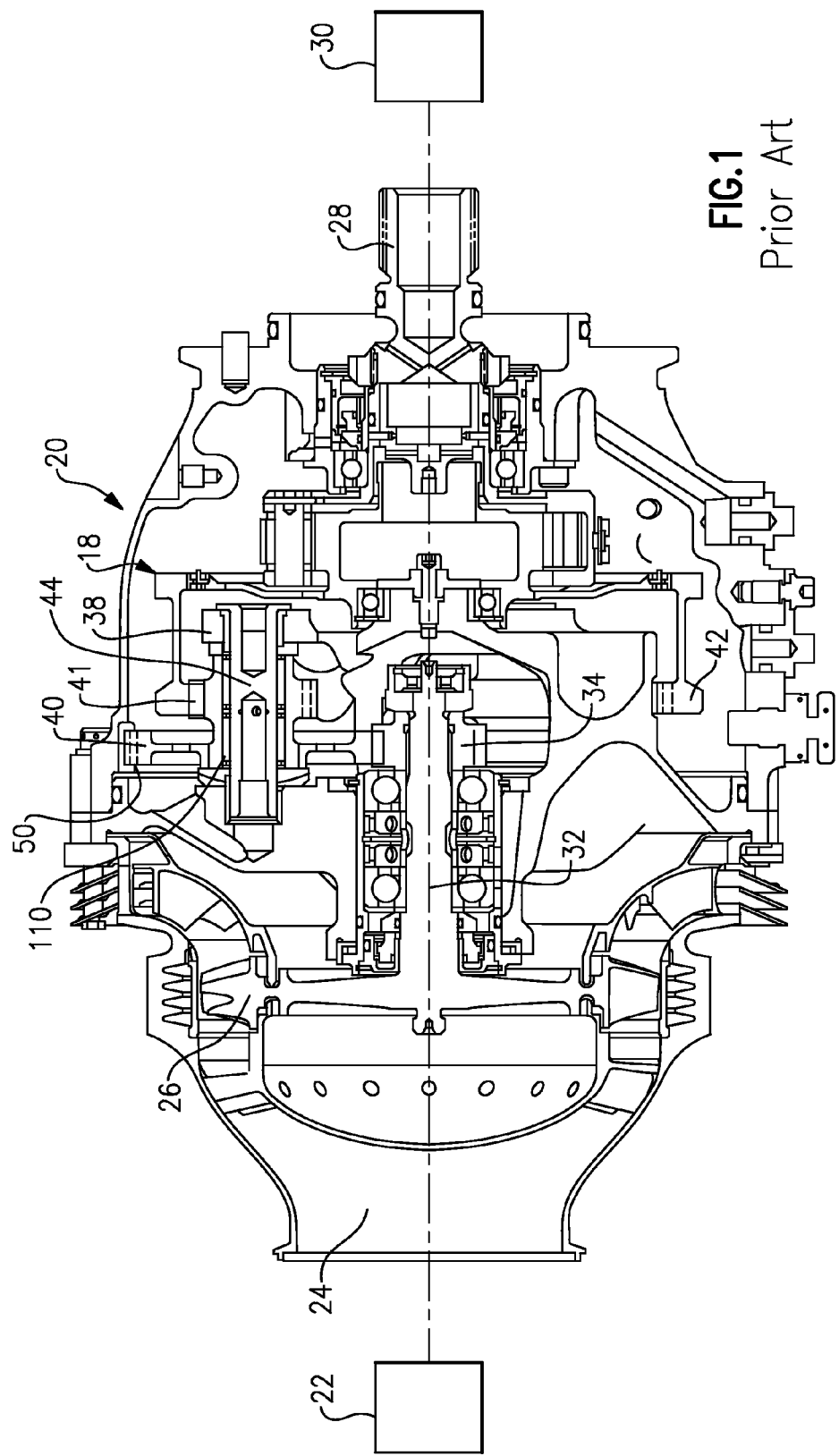
FIG. 1 shows a prior art air turbine starter.

An air turbine starter assembly 20 may be associated with an aircraft, or other systems including a gas turbine engine. A source of compressed air 22, which may be from an auxiliary power unit, as typically utilized while an aircraft is on the ground, delivers hot, high pressure air into an inlet 24. The high pressure air flows across a turbine rotor 26, causing the turbine rotor 26 to rotate. As the turbine rotor 26 rotates, it rotates an output shaft 28 through a planetary gear system. The output shaft 28 may be utilized as a starter to start operation of a main gas turbine engine 30. The planetary gear system 18 includes a sun gear 34 that is driven by a rotor shaft 32 that rotates with the turbine rotor 26. The sun gear 34 in turn drives a plurality of planet gears 40 (only one of which is shown) through teeth 50. The planet gears 40 include output gear teeth 41, which drive a ring gear 42. The ring gear 42 drives the output shaft 28 through a mechanical connection.

The planet gears 40 rotate on a stationary planet shaft 44, mounted in a housing 38. Intermediate needle bearings 110 are positioned between an inner diameter of the gears 40, and an outer diameter of the planet shafts 44.

Figure 2:
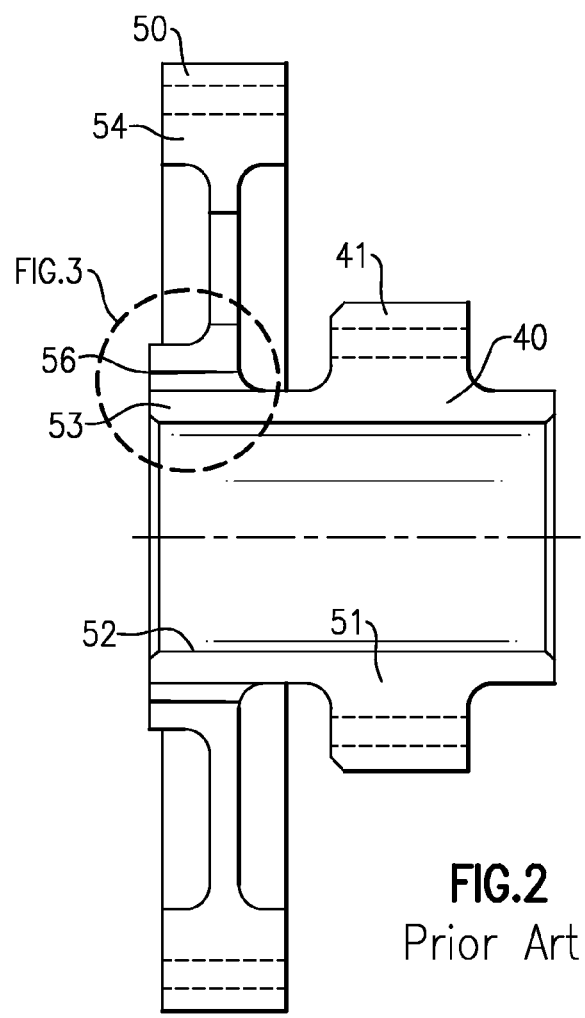
FIG. 2 shows a planet gear in the prior art air turbine starter.

FIG. 2 shows a detail of the prior art planet gear 40. As shown, there are two parts, 51 and 54, which together make up the planet gear 40. The part 51 has a shaft 53 which defines an inner bore 52. A second part 54 carries the input gear teeth 50. The output gear teeth 41 are formed on the part 51. As shown, an interface 56 between the parts 51 and 54 is directly radially outwardly of an inner diameter surface 52 of the part 51. It is this inner diameter 52 that is provided with a surface hardening treatment, or carburized surface.

Figure 3:
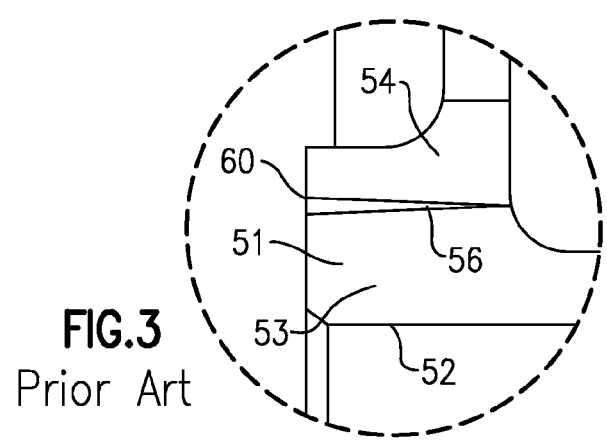
FIG. 3 shows a prior art detail in the portion labeled by 3 in FIG. 2.

As shown in FIG. 3, a weld location 60 is formed at the junction 56. This weld location 60 is radially close to the surface 52, and can result in loss of hardness.

A first embodiment of the present invention is illustrated in FIG. 4. In the planet gear 70, a first part 72 is secured to a second part 76. Gear teeth 50 are formed on part 76 and gear teeth 41 are formed on part 72. As can be seen, the part 76 has a cylindrical boss 78 having a chamfer 80, and an innermost side 112. As can be seen, the innermost side 112 abuts an end 74 of the gear tooth 41 on the part 72.

The chamfer 80 on the part 76 is at an angle B. In one embodiment angle B is 45°. In embodiments, angle B may range between 40° and 50°. As can also be seen, a relief 82 is formed at a location adjacent to the end 74 on the part 72. The relief 82 is formed in part by a chamfer 114, which is at an angle A.

Since the end 112 abuts the end 74, the exact positioning of the part 76 on the part 72 is assured.

As can be appreciated from FIG. 5A, the outer diameter of the part 72 is at a diameter $D_1$. The inner diameter of the part 76 is defined as $D_2$. In one embodiment, $D_1$ was 1.1592" (2.9443 cm). In that same embodiment $D_2$ was 1.1566" (2.9377 cm).

In embodiments, the force fit between the parts 76 and 72 is provided by $D_1$ being much larger than $D_2$. The force fit is selected to be sufficient that the two parts will not rotate relative to each other, even without a weld joint. In this manner, the weld joint is eliminated, and the challenge to the reduction in hardness is also eliminated.

In embodiments, a ratio of $D_1$ to $D_2$ is between 1.0005 and 1.0100. More narrowly, the ratio may be between 1.0005 and 1.0025.

FIG. 6 shows another embodiment 90. In embodiment 90, the parts 92 and 98 are again secured with a large interference fit. The right-most end 100 of the part 98 abuts a side surface 96 of the gear tooth 41. A chamfer 94 is formed in the part 92, and leads into a relief adjacent to the end 96. Another chamfer 102 is formed at a radially inner surface of the end 100 of part 98. The chamfer on the part 92 is at an angle C. In one embodiment an angle C was 45°. In embodiments, the angle C can be between 40° and 50°.

In one embodiment the chamfer 102 was at an angle E. In embodiments, the angle E is 20°, and may be between 15° and 25°.

The outer periphery of the part 92 in this embodiment is at a diameter $D_3$. In this embodiment, $D_3$ is 1.1322" (2.8757 cm). In the same embodiment, the inner diameter of the part 98 is at a diameter of $D_4$. In an embodiment $D_4$ is 1.1300" (2.8701 cm).

In embodiments, a ratio of $D_3$ to $D_4$ is selected such that a strong interference fit will occur, and such the parts 98 and 92 will not rotate relative to each other, even with the elimination of the weld joint. As with the above embodiment, the elimination of the weld joint eliminates the loss of hardness as mentioned above.

In embodiments, a ratio of $D_3$ to $D_4$ is between 1.0005 and 1.0100. More narrowly, the ratio may be between 1.0005 and 1.0025.

In a method, a planet gear, as shown in either embodiment, may be inserted onto mounting bearings on an outer periphery of the support portion of a planet shaft in an air turbine starter. The planet gear is configured as set forth above, and consistent with one of the two embodiments.

Although an embodiment of this invention has been disclosed, a worker of ordinary skill in the art would recognize that certain modifications would come within the scope of this invention. For that reason, the following claims should be studied to determine the true scope and content of this invention.

What is claimed is:

1. A planet gear for use in an air turbine starter comprising:
   a first part having a first set of gear teeth at a first axial location, and having a shaft extending axially away from said first set of gear teeth;
   a second part interference fit on said first part, said second part having a second set of gear teeth, and said second part being mounted on said shaft of said first part;
   an outer diameter of said first part at said shaft being selected to be significantly larger than an inner diameter of a cylindrical portion of said second part which is interference fit on said shaft, with a ratio of said outer periphery diameter of said first part to said inner diameter of said second part being between 1.0005 and 1.0100,
   wherein said second part has a chamber on inner end of said cylindrical portion that is adjacent to said first of gear teeth;
   wherein a cutout portion is provided on said first gear part between said outer diameter and said first set of gear teeth;
   wherein said output portion has a chamber formed between said outer diameter, and said first set of gear teeth, and
   wherein said inner end of said second part abuts an end face of said first part.

2. A planetary gear system for use in an air turbine starter comprising:
   a sun gear;
   a plurality of planet gears driven by said sun gear;
   said plurality of planet gears engaged to drive a ring gear;
   said planet gears, including a bearing within an inner peripheral bore in said planet gears, and a planet shaft in each said planet gear supported within said bearing, said planet shaft extending along a central axis;
   said planet gears being formed with a surface hardened treatment at said inner peripheral bore which runs on said bearing;
   each said planet gear including a first part having a first set of gear teeth at a first axial location, and having a gear shaft extending axially away from said first set of gear teeth, a second part interference fit on said first part, said second part having a second set of gear teeth, and said second part being mounted on said gear shaft of said first part, and an outer diameter of said first part at said gear shaft being selected to be significantly larger than an inner diameter of a cylindrical portion of said second part which is interference fit on said gear shaft, with a ratio of said outer diameter of said first part to said inner diameter of said second part being between 1.0005 and 1.0100;
   wherein said second part has a chamber on an inner end of said cylindrical portion which is adjacent to said first set of gear teeth;
   wherein a cutout portion is provided on said first gear part between said outer diameter and said first set of gear teeth;
   wherein said cutout portion has a chamber formed between said outer diameter, and said first set of gear teeth; and
   wherein said inner end of said second part abuts an end face of said first part.

3. An air turbine starter comprising:
   an air inlet for directing air across a turbine rotor, said turbine rotor being driven to rotate by the air, and drive a turbine shaft, said turbine shaft driving a sun gear;
   a plurality of planet gears driven by said sun gear;
   said plurality of planet gears engaged to drive a ring gear;
   said planet gears including a bearing within an inner peripheral bore in said planet gears, and a planet shaft in each said planet gear supported within said bearing, said planet shaft extending along a central axis;
   said planet gears including a surface hardened treatment at an inner peripheral bore which rides on said bearing, and said planet gear including a first part having a first set of gear teeth at a first axial location, and having a gear shaft extending axially away from said first set of gear teeth, a second part interference fit on said first part, said second part having a second set of gear teeth, and said second part being mounted on said gear shaft of said first part, and an outer diameter of said first part at said gear shaft being selected to be significantly larger than an inner diameter of a cylindrical portion of said second part which is interference fit on said gear shaft, with a ratio of said outer diameter of said first part to said inner diameter of said second part being between 1.0005 and 1.0100;
   wherein said second part has a chamber on an inner end of said cylindrical portion which is adjacent to said first set of gear teeth;
   wherein a cutout portion is provided on said first gear part between said outer diameter and said first set of gear teeth;
   wherein said cutout portion has a chamber formed between said outer diameter and said gear teeth; and
   wherein said inner end of said second part abuts a root of said first set of gear teeth.

4. A method of installing a planet gear within an air turbine starter comprising the steps of:

inserting a planet gear onto mounting bearings on an outer periphery of a support portion of a planet shaft;

wherein said planet gear includes a first part having a first set of gear teeth at a first axial location, and having a gear shaft extending axially away from said first set of gear teeth, a second part interference fit on said first part, said second part having a second set of gear teeth, and said second part being mounted on said gear shaft of said first part, and an outer diameter of said first part at said gear shaft being selected to be significantly larger than an inner diameter of a cylindrical portion of said first part which is interference fit on said gear shaft, with a ratio of said outer diameter of said first part to said inner diameter of said second part being between 1.0005 and 1.0100;

wherein said second part has a chamber on an inner end of said cylindrical portion which is adjacent to said first set of gear teeth;

wherein a cutout portion is provided on said first gear part between said outer diameter and said first set of gear teeth;

wherein said cutout portion has a chamber formed between said outer diameter and said gear teeth; and wherein said inner end of said second part abuts an end face of said first part.

* * * * *